United States Patent [19]

Gebhardt et al.

[11] 4,442,165
[45] Apr. 10, 1984

[54] LOW-DENSITY THERMALLY INSULATING CARBON-CARBON SYNTACTIC FOAM COMPOSITE

[75] Inventors: Joseph J. Gebhardt, Malvern; Paul W. Juneau, Jr., Norristown, both of Pa.

[73] Assignee: General Electric Co., Philadelphia, Pa.

[21] Appl. No.: 247,703

[22] Filed: Mar. 26, 1981

[51] Int. Cl.³ .......................... B32B 5/18; B32B 7/02; B32B 9/00
[52] U.S. Cl. ................. 428/307.7; 428/312.2; 428/317.9; 428/319.1; 428/408
[58] Field of Search .............. 428/304, 306, 310, 408, 428/307.7, 312.2, 317.9, 319.1

[56] References Cited

U.S. PATENT DOCUMENTS

| | | | |
|---|---|---|---|
| 3,302,999 | 2/1967 | Mitchell | 428/408 |
| 3,549,847 | 12/1970 | Clark | 428/408 |
| 3,980,105 | 9/1976 | Myskowski | 428/408 |
| 4,166,145 | 8/1979 | Hatch et al. | 428/408 |
| 4,180,211 | 12/1979 | Olcott et al. | 428/408 |

*Primary Examiner*—William J. Van Balen
*Attorney, Agent, or Firm*—Allen E. Amgott

[57] ABSTRACT

A low-density, thermally insulating composite which is ablation resistant and impervious to gases and liquids. The composite is comprised of a carbon-carbon syntactic foam material which is covered and penetrated by pyrolytic carbon, in order to increase the strength of the foam material. Pyrolytic graphite is then deposited onto at least one surface of the pyrolytic carbon covered and penetrated foam material to improve the thermal insulation of the composite and render it impervious to gas or liquids.

2 Claims, 1 Drawing Figure

LOW-DENSITY THERMALLY INSULATING CARBON-CARBON SYNTACTIC FOAM COMPOSITE

BACKGROUND OF THE INVENTION

1. Field of the Invention

This invention relates to low-density thermally insulating composites and a method of fabricating those composites.

2. Description of the Prior Art

Reinforced carbon-carbon syntactic foam materials having low thermal conductivity and low density characteristics have been known to be useful as insulation and protective shields. This foam material is generally comprised of a mixture of carbon fibers and hollow carbon-microspheres in a thermosetting resin matrix. While this foam material has good low density and thermally insulating characteristics, the carbon filaments tend to crumble if subjected to continuous shock or vibration. This material also is not impervious to the flow of gases, liquids, or high intensity infrared energy therethrough.

OBJECTS OF THE INVENTION

It is therefore an object of this invention to provide an improved low-density thermally insulating material which has increased strength.

It is another object of this invention to provide a low-density thermally insulating material which has increased ablation resistance and vibration or crumbling resistance.

It is another object of this invention to provide an improved low-density thermally insulating material which is nonporous and is impervious to gases and liquids.

It is further an object of this invention to provide a low-density thermally insulating composite which is also impervious to high intensity infrared radiation.

Other objects of the invention will be pointed out hereafter.

SUMMARY OF THE INVENTION

A low-density, thermally insulating composite is provided by covering and penetrating a reinforced carbon-carbon syntactic foam material with pyrolytic carbon to increase the strength of the material. However, the pyrolytic carbon increases the thermal conductivity of the composite. Pyrolytic graphite is then deposited onto at least one surface of the covered and penetrated material to render the final composite impervious to gas or liquid and to increase its thermal insulation. A small amount of boron can be included within the pyrolytic graphite layer to enable the composite to reflect high intensity infrared energy.

BRIEF DESCRIPTION OF THE PREFERRED EMBODIMENT

Figure 1:
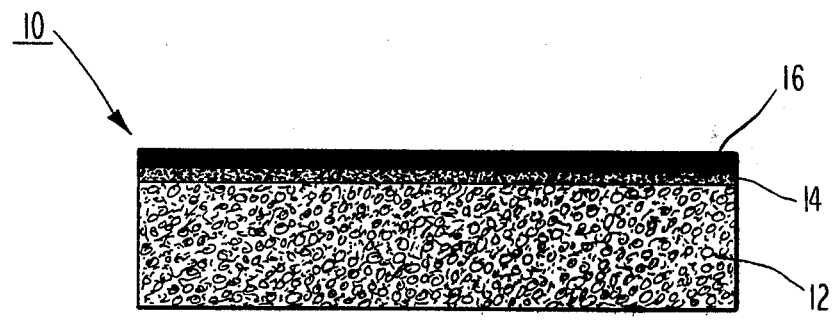
FIG. 1 shows a partial sectional view of the low-density thermally insulating composite in accordance with the invention.

Referring to FIG. 1, low-density, thermally insulating composite 10 comprises a reinforced, carbon-carbon syntactic foam material 12 exhibiting low thermal conductivity and low-density characteristics, the foam material further comprising a thermosetting resin matrix and a pyrolyzed mixture of carbon fibers and hollow carbon spheres within said thermosetting resin matrix. In accordance with the invention, pyrolytic carbon is distributed throughout and covers at least a portion of foam material 12. The pyrolytic carbon forms a layer or covering 14 as well as penetrates into the voids or spaces within foam material 12. A pyrolytic graphite layer 16 is deposited upon pyrolytic carbon layer 14. Pyrolytic carbon layer 14 provides the critical interface which promotes the adherence of the pyrolytic graphite layer 16 to the low-density, thermally insulating foam material 12.

Generally, the low density, thermally insulating composite having the pyrolytic graphite deposited upon at least one surface of the syntactic foam material is made by the steps comprising providing or forming a body of pyrolyzed, charred, phenolic, syntactic carbon-carbon foam material, covering the surface of and penetrating the foam material with pyrolytic carbon, and depositing a layer of pyrolytic graphite onto at least one surface of the pyrolytic carbon-covered-and-penetrated syntactic foam material.

The pyrolytic carbon formed from the hydrocarbon gas is formed at temperatures and pressures which are lower than the temperature and pressure required to form the pyrolytic graphite from the hydrocarbon gas. The hydrocarbon gas is heated at a temperature which is sufficient to form the pyrolytic carbon, and thereafter the hydrocarbon gas is heated at a higher temperature sufficient to form pyrolytic graphite and at a pressure the same as or higher than the pressure required to form the pyrolytic carbon.

As described in U.S. Pat. No. 3,549,847, assigned to the same assignee as the assignee of the present invention, pyrolytic graphite can be formed and deposited upon the pyrolytic carbon layer by gradually increasing the temperature or by gradually increasing the temperature and the pressure at which the pyrolytic carbon is formed.

In carbon foam material 12, the amount of pyrolytic carbon penetrating into foam 12 may be greater nearer the surface of the foam material than in the interior of the foam material, and there may be a higher concentration of pyrolytic carbon at or near the surface than inside the foam material. Thus, the voids or spaces within foam material 12 closest to pyrolytic carbon layer 14 may contain greater amounts of pyrolytic carbon than the voids or spaces in foam material 12 which are at the greatest distance from pyrolytic carbon layer 14.

The term "pyrolytic carbon" as used herein represents the carbon which is formed and deposited from a hydrocarbon gas upon a body at a temperature from about 1000° C. to about 1200° C. at a pressure less than about 1.0 mm Hg and which is capable of providing good depth of penetration into the voids, spaces and/or pores of the carbon-carbon syntactic foam material. As used herein, "pyrolytic graphite" represents a pure polycrystalline graphite deposited from the hydrocarbon gas (carbon bearing vapor) at temperatures of about 1800° C. to about 2100° C. or higher, and is a metallic appearing material that is impervious to gases and liquids.

The low-density, thermally insulating, carbon-carbon syntactic foam material which is impregnated or penetrated with pyrolytic carbon, and thereafter covered or coated with pyrolytic graphite is a low-density, thermally insulating, reinforced carbon-carbon syntactic foam material of the type comprising a pyrolyzed mixture of carbon fibers and hollow carbon spheres in a thermosetting resin matrix.

In forming foam 12, carbon fibers, carbon microspheres and phenolic resin are slurried together. Excess resin solution is removed, and the remaining residue is dried, cured and pyrolyzed. A resulting reinforced carbon-carbon syntactic foam material has a low density and thermal conductivity at high temperatures and low atmospheric pressures. More specifically, a solution of phenolic resin and acetone is prepared by diluting the resin with acetone to 50% by weight of the resin. Carbon fibers of approximately 3 to 100 microns in average length are added to the solution, until the carbon fibers are uniformly dispersed and slurried therein. A desired amount of carbon microspheres (i.e. hollow-carbon spheres having an average diameter between 50 to 100 microns), are mixed into the slurry, until there is also a uniform dispersion of the carbon microspheres in the slurry. Resin is removed from the slurry through draining with a vacuum at atmospheric pressure of about 15 lbs/in$^2$. After draining, the residue is oven dried at a temperature of about 163° C., then cured and pyrolyzed at about 593° C., in an inert atmosphere, such as argon, whereby a carbon-carbon foam material is produced. The formed foam has densities ranging from about 0.18 to about 0.32 grams/cm$^3$ depending upon the ratio of carbon microspheres to carbon fibers utilized. The amount of carbon fibers to the amount of carbon spheres in the slurry may be varied to provide a final foam product having a broad range of controllable, physical and thermal characteristics. A typical mix includes 70% by weight of carbon fibers to 30% by weight of carbon-microspheres. This foam also has good insulative characteristics, and a typical low-thermal conductivity (i.e. "K" value) of 0.64 times $10^{-5}$ BTU/ft.sec.° F. at 480° F.

Any hydrocarbon gas which typically yields pyrolytic carbon and/or pyrolytic graphite upon heating or cracking, may be used to make the pyrolytic carbon and pyrolytic graphite, respectively. Typical hydrocarbon gases which may be used in the process of the invention, include methane, ethane, propane, butane, acetylene, benzene, toluene and the like. The gases may be purified and/or dried in any conventional manner as desired by any method well known in the prior art. Auxiliary gases such as hydrogen, oxygen and the like; mixtures of hydrocarbon gases; and diluent inert gases, such as argon, nitrogen and the like, can be used in the process of the present invention as long as the heated gas or gases can form a pyrolytic carbon which penetrates the foam and covers the surface of the foam, and as long as the gas or gases can form a pyrolytic graphite which can be deposited upon the pyrolytic carbon-covered-and-penetrated foam material. The preferred hydrocarbon gas is methane. Although the preferred embodiments utilize the same hydrocarbon gas for forming the pyrolytic carbon and for forming the pyrolytic graphite, it is possible in accordance with the present invention to utilize one gas or mixture of gases for forming and depositing the pyrolytic carbon and a different gas or mixture of gases for forming and depositing the pyrolytic graphite. Thus, for example, propane gas may be used to form the pyrolytic carbon, and methane gas may be used to form the pyrolytic graphite.

The pyrolytic graphite can be made by incorporating boron to render graphite layer 16 impervious to high intensity radiation. In one preferred embodiment, boron trichloride is added to the stream of hydrocarbon gas to produce a deposit of boron in the pyrolytic graphite layer, and in one preferred embodiment of the present invention, less than about 0.2% by weight (based upon the weight of the graphite) of boron is deposited in pyrolytic graphite layer 16 by adding 10 volume percent boron trichloride vapor (based on the volume of methane gas) to the methane feed gas.

Generally, in the process of the present invention, the body of pyrolyzed, charred, phenolic, syntactic carbon-carbon foam material has at least a portion of its surface covered with and penetrated with pyrolytic carbon, and at least a portion of the pyrolytic carbon is covered with a layer of the pyrolytic graphite. In preferred embodiments, and especially when methane is used as the hydrocarbon gas, the hydrocarbon gas is heated at a temperature of about 1000° C. to about 1200° C. to form the pyrolytic carbon vapor, and the hydrocarbon gas is heated at a temperature of about 1800° C. to about 2100° C. to form the pyrolytic graphite. In other preferred embodiments, as discussed above, the hydrocarbon gas is heated at a range of about 1000° C. to about 1200° C., and the temperature is gradually increased to a range of about 1800° C. to about 2100° C., and during the gradual increase in temperature, less pyrolytic carbon is formed from the hydrocarbon gas and deposited upon the substrate and more pyrolytic graphite is formed and deposited thereon until the temperature is reached, wherein the hydrocarbon gas is completely converted to pyrolytic graphite. Generally, a wide density range dependent upon the temperature of preparation and the gradual increase of temperature results in the higher density crystallite pyrolytic graphite being deposited. Generally, temperature ranges and desired temperatures can be adjusted by one skilled in the art, depending upon the amount of pyrolytic carbon and the amount of pyrolytic graphite desired upon the composite foam material, depending upon the particular gas or mixture of gases used, and depending upon the pressure at which the gas is cracked and deposited.

When the temperature is raised gradually from a range of about 1000° C. to about 1200° C. to a range of about 1800° C. to about 2100° C., the pyrolytic carbon is gradually converted to the pyrolytic graphite, and the pyrolytic graphite layer becomes firmly attached to the pyrolytic carbon layer which not only forms a layer upon the foam material, but also penetrates at least part of the voids and spaces within the foam material.

Although pressure is not a critical parameter in the process of the present invention, pressure at which the hydrocarbon gas or gases are cracked and deposited upon the respective surfaces or layers, can be varied as desired. One skilled in the art can control, maintain and adjust pressures as desired and can make compensating variations and adjustments in temperatures to compensate for pressure changes. Generally, the pressure changes are carried out within a chamber which is also used to heat the gas and the foam material being impregnated and/or coated or otherwise treated. Although the present invention is not to be limited to any specific pressure ranges, in preferred embodiments, the hydrocarbon gas is maintained at a pressure within the range of about 0.3 mm Hg pressure to about 0.8 mm Hg pressure to form the pyrolytic carbon, and the hydrocarbon gas is maintained within the range of about 0.5 mm Hg to about 5.0 mm Hg to form the pyrolytic graphite. In certain preferred embodiments, for example, when methane gas is used as the hydrocarbon gas, the hydrocarbon gas is maintained at a pressure of about 0.5 mm Hg pressure for the formation and deposit of the pyrolytic carbon, and the hydrocarbon gas is maintained at a pressure within the range of about 0.5 mm Hg to about 4.0 mm Hg for the formation and deposit of the pyrolytic graphite upon the surface of the pyrolytic carbon.

In one preferred embodiment, the hydrocarbon gas is heated at a range of about 1000° C. to about 1200° C. at a pressure of about 0.5 mm Hg, and the temperature is gradually increased to within the range of about 1800° C. to about 2100° C., while increasing the pressure from 0.5 mm Hg to about 4.0 mm Hg.

The length of time required to deposit the pyrolytic carbon and pyrolytic graphite is not critical and varies according to the thickness of the deposit desired for a particular use. Generally, the thickness of the pyrolytic carbon or pyrolytic graphite increases by the length of time which the hydrocarbon gas is cracked at a given temperature and pressure. In most embodiments, the pyrolytic carbon is deposited for one hour to about 24 hours, and the pyrolytic graphite is deposited for one hour to about 24 hours. In one preferred embodiment, the pyrolytic carbon is deposited for 24 hours and the pyrolytic graphite is deposited thereon for 2 hours. The thickness of the pyrolytic carbon and pyrolytic graphite layers is not critical, and the respective layers may each range from less than 1 mil to 25 mils or higher.

In certain cases, it is desirable to smooth the surface of the low density, thermally insulating composite after the foam material has been penetrated with and/or covered with the pyrolytic carbon. This may be carried out by any conventional means for providing a smooth surface, for example, sanding, grinding, shaving and the like. Thus, for example, the foam material is initially penetrated with and/or covered with pyrolytic carbon, and the surface is then sanded to provide a smooth surface. It may be necessary in certain cases to cool the surface prior to the smoothing step. After the smoothing step, additional pyrolytic carbon may be deposited upon the smoothed surface, or pyrolytic graphite may be deposited upon the smoothed surface, or there may be a gradual increase in temperature which results in a gradual reduction of pyrolytic carbon deposit accompanied by a gradual increase in pyrolytic graphite deposit. Furthermore, at any step in the process, it may be necessary to cool the carbon foam after undergoing treatment, and in such cases, it is within the purview of one skilled in the art to continue heating for the continued deposition of pyrolytic carbon or pyrolytic graphite material thereon.

The process of the present invention can be carried out in any suitable apparatus wherein the carbon foam can be mounted; the stream of hydrocarbon gas can be heated at the desired temperature and the desired pressure; and the heated hydrocarbon gas stream can be directed through the foam and/or upon the surface or surfaces of the carbon foam material. For example, the process of the present invention may be carried out in a conventional vacuum oven having mounting means for mounting the carbon foam material in the stream of heated hydrocarbon gas, having means provided for directing the stream of hydrocarbon gas or gases through or upon the carbon foam material and having means for providing the desired pressure therein.

The low-density, thermally insulating composites made in accordance with the present invention are ablation, vibration and crumbling resistant, impervious to gases and liquids and have increased strength. For example, it may be used for rocket nozzles, high temperature furnace linings, high temperature piping, and the like. Because of the imperviousness of the low-density, thermally insulating composite of the invention to high intensity radiation, the invention may also be used in or upon devices and bodies where it is desirable to prevent the permeation of intense radiation.

While the present invention has been described in detail with particular reference to certain preferred embodiments thereof, it will be understood that variations and modifications can be affected within the spirit and scope of the invention.

What we claim and desire to secure by Letters Patent of the United States is:

1. A low-density, thermally insulating composite comprising:
    (a) a reinforced, carbon-carbon syntactic foam material exhibiting low thermal conductivity and low density characteristics, said foam material further comprising a thermosetting resin matrix and a pyrolyzed mixture of carbon fibers and hollow carbon spheres within said thermosetting resin matrix;
    (b) pyrolytic carbon covering and penetrating into at least a portion of said foam material; and,
    (c) a layer of pyrolytic graphite on at least a portion of said pyrolytic carbon covered and penetrated syntactic foam material.

2. A low-density, thermally insulating composite according to claim 1, wherein said pyrolytic graphite layer includes less than approximately 0.2 percent by weight of boron, based upon the weight of the graphite.

* * * * *